US009979880B2

(12) United States Patent
Pell et al.

(10) Patent No.: US 9,979,880 B2
(45) Date of Patent: May 22, 2018

(54) SYSTEMS AND METHODS FOR GESTURE-BASED CONTROL OF EQUIPMENT IN VIDEO COMMUNICATION

(71) Applicant: Facebook, Inc., Menlo Park, CA (US)

(72) Inventors: Oliver Pell, London (GB); Konrad Horst Michels, Los Gatos, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days. days.

(21) Appl. No.: 15/279,282

(22) Filed: Sep. 28, 2016

(65) Prior Publication Data
US 2018/0091727 A1    Mar. 29, 2018

(51) Int. Cl.
H04N 7/14        (2006.01)
H04N 5/232       (2006.01)
H04N 7/15        (2006.01)
H04N 21/4788     (2011.01)
H04N 21/422      (2011.01)

(52) U.S. Cl.
CPC ..... H04N 5/23216 (2013.01); H04N 5/23203 (2013.01); H04N 5/23296 (2013.01); H04N 7/15 (2013.01); H04N 21/42222 (2013.01); H04N 21/42224 (2013.01); H04N 21/4788 (2013.01)

(58) Field of Classification Search
CPC ............. G06F 3/04817; G06F 3/0482; G06F 3/04842; G06F 3/04886; G06F 9/4443; G06F 9/44505; G06F 2203/04803; H04M 1/72563; H04M 2250/22; H04N 5/23203; H04N 5/23216; H04N 5/23296; H04N 7/15; H04N 21/42222; H04N 21/42224; H04N 21/4788

USPC ............ 348/14.01–14.16; 370/259–271, 370/351–357; 379/201.01, 379/202.01–207.01; 709/201–207, 709/217–248
See application file for complete search history.

(56) References Cited

U.S. PATENT DOCUMENTS

| | | | | |
|---|---|---|---|---|
| 6,313,875 B1* | 11/2001 | Suga | ...................... | H04N 7/147 348/14.08 |
| 7,770,115 B2* | 8/2010 | Gallmeier | ............... | G06F 3/017 715/716 |
| 8,094,193 B2* | 1/2012 | Peterson | ............ | H04N 5/23203 348/169 |
| 8,842,161 B2* | 9/2014 | Feng | ........................ | H04N 7/15 348/14.08 |
| 9,270,941 B1* | 2/2016 | Lavelle | .................... | H04N 7/15 |
| 2011/0085016 A1* | 4/2011 | Kristiansen | ......... | G06F 3/04883 348/14.03 |
| 2011/0234746 A1* | 9/2011 | Saleh | ...................... | G06F 3/041 348/14.03 |

(Continued)

Primary Examiner — Hemant Patel
(74) Attorney, Agent, or Firm — Sheppard Mullin Richter & Hampton LLP

(57) ABSTRACT

Systems, methods, and non-transitory computer readable media are configured to obtain video data from a camera used in a video conferencing system. A user interface displaying the video data can be provided on a screen, wherein the screen is capable of receiving touch input. A first touch input associated with a function of the camera can be obtained. The first touch input can be received from the screen. An instruction for executing the function can be sent to the camera. The user interface can be updated in response to the execution of the function of the camera.

16 Claims, 9 Drawing Sheets

(56) References Cited

U.S. PATENT DOCUMENTS

2014/0111600 A1\* 4/2014 Schaefer ................ H04N 5/232
348/14.08

\* cited by examiner

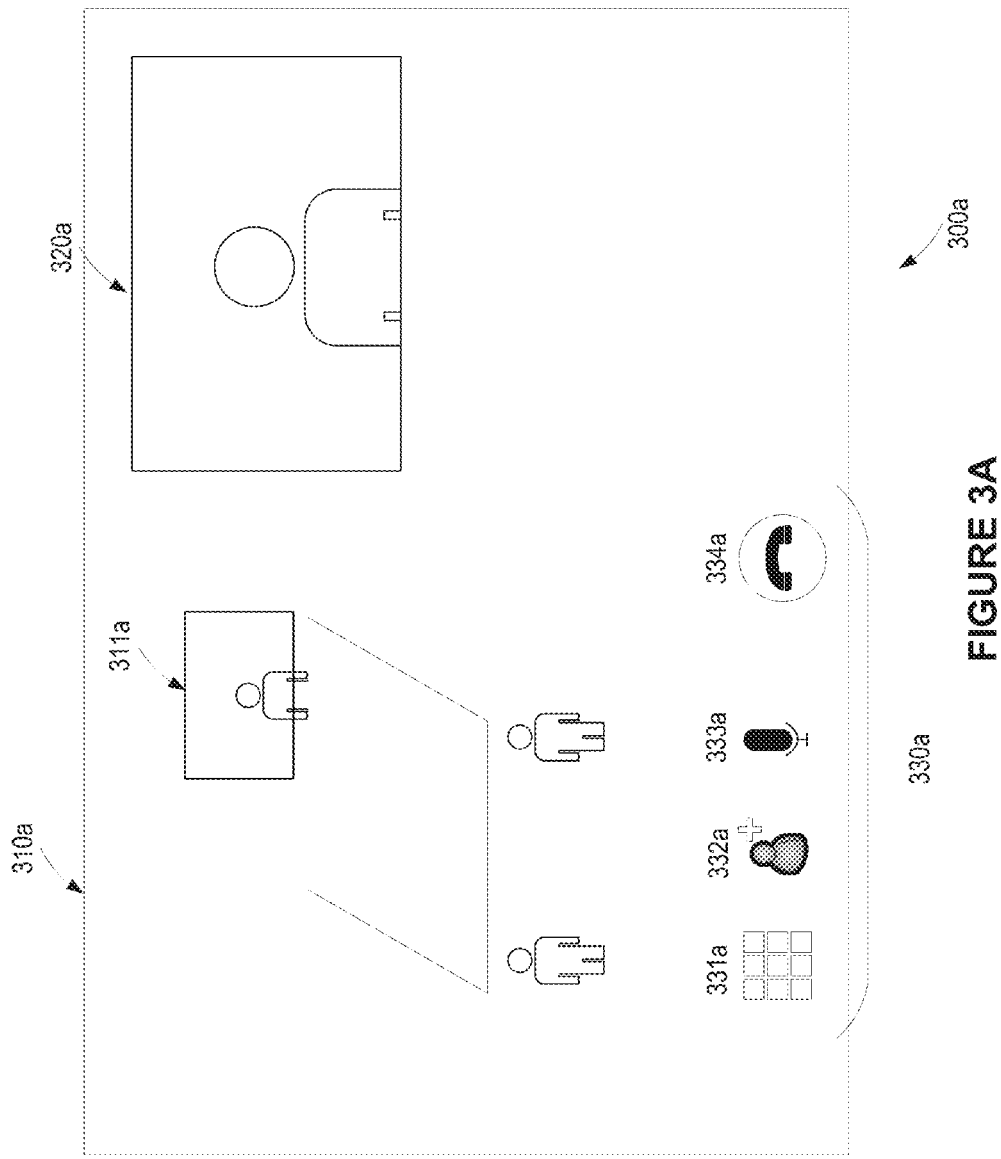

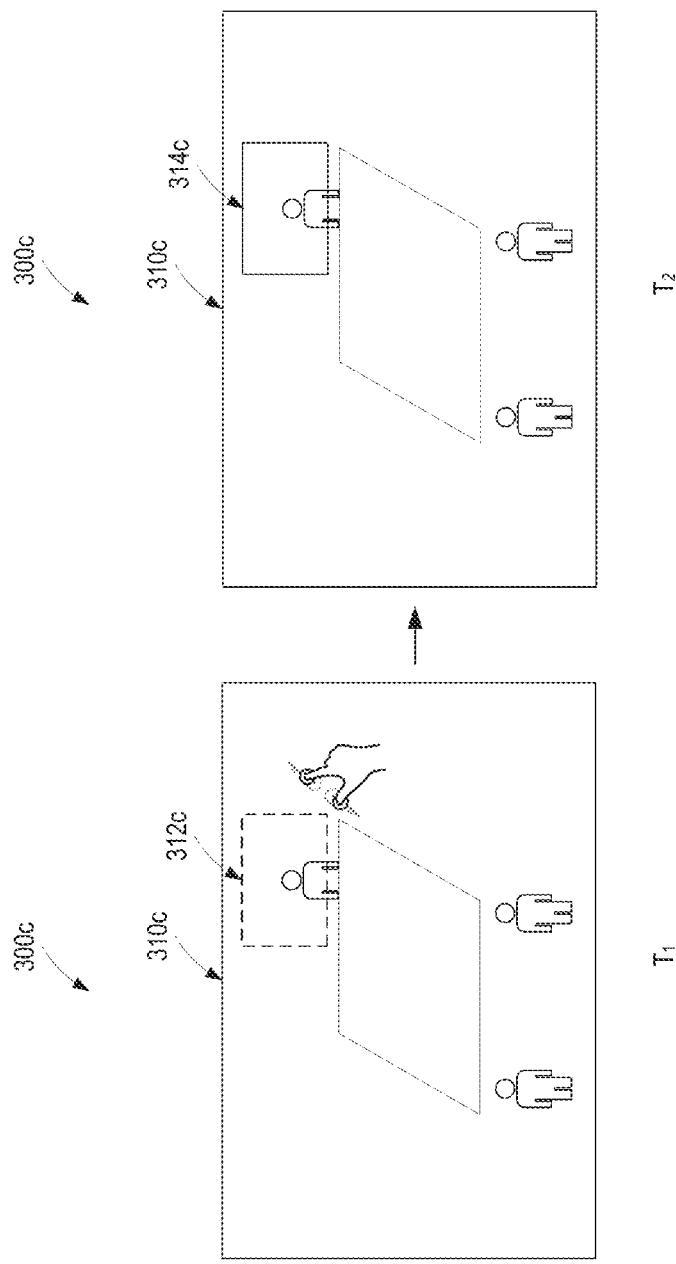

SYSTEMS AND METHODS FOR GESTURE-BASED CONTROL OF EQUIPMENT IN VIDEO COMMUNICATION

FIELD OF THE INVENTION

The present technology relates to the field of video communications. More particularly, the present technology relates to techniques for controlling equipment used in video communications.

BACKGROUND

Today, people often utilize computing devices for a wide variety of purposes. Users can use their computing devices, for example, to communicate and otherwise interact with other users. Such interactions are increasingly popular over a social network.

Interactions in a social network may involve various types of communication. Some types of communication supported by a social networking system allow a user to engage in focused exchanges. For example, the user may target a particular user or users through the use of a messaging system or an email system supported by the social networking system. As another example, the user can enter into audio communications or video communications supported by the social networking system with another user.

In many instances, video communications can be preferred by users because video communications can allow the users to most effectively convey information and simulate real life communications. In some instances, two participants in different locations can engage in video communications. It also can be desirable to allow a group of users in multiple locations to use video communications to facilitate communications among the group.

SUMMARY

Various embodiments of the present technology can include systems, methods, and non-transitory computer readable media configured to obtain video data from a camera used in a video conferencing system. A user interface displaying the video data can be provided on a screen, wherein the screen is capable of receiving touch input. A first touch input associated with a function of the camera can be obtained. The first touch input can be received from the screen. An instruction for executing the function can be sent to the camera. The user interface can be updated in response to the execution of the function of the camera.

In some embodiments, the first touch input is a touch gesture associated with the function of the camera.

In certain embodiments, the user interface includes one or more of: a view of the camera and a wide-angle view of a location associated with the camera.

In an embodiment, the camera is a pan-tilt-zoom (PTZ) camera.

In some embodiments, the wide-angle view of the location is provided by a wide-angle camera.

In an embodiment, the wide-angle view of the location is obtained by the camera based on one or more of: zooming out the camera in connection with a pan or zoom operation, gradually zooming out and zooming back in, or zooming out the camera and applying a digital zoom for the view of the camera.

In certain embodiments, the first touch input is a touch gesture for zooming in the camera, the function of the camera is a zoom in of the camera, and the updating the user interface includes indicating a perimeter around an area in the wide-angle view on which the camera is zoomed in.

In an embodiment, the first touch input is a touch gesture for zooming in the camera, the function of the camera is a zoom in of the camera, and the updating the user interface includes displaying zoomed in video data of the camera.

In some embodiments, the first touch input is a touch gesture for zooming in the camera, and the function of the camera is a zoom in of the camera. At least one of a face or an object in one or more positions associated with the first touch input can be recognized, and the camera can be zoomed in on the at least one of a face or an object.

In certain embodiment, the user interface includes a plurality of icons associated with control features of the video conferencing system.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIGS. 3A-3C illustrate example user interfaces for gesture-based control of equipment in video communications, according to an embodiment of the present technology.

Figure 1:
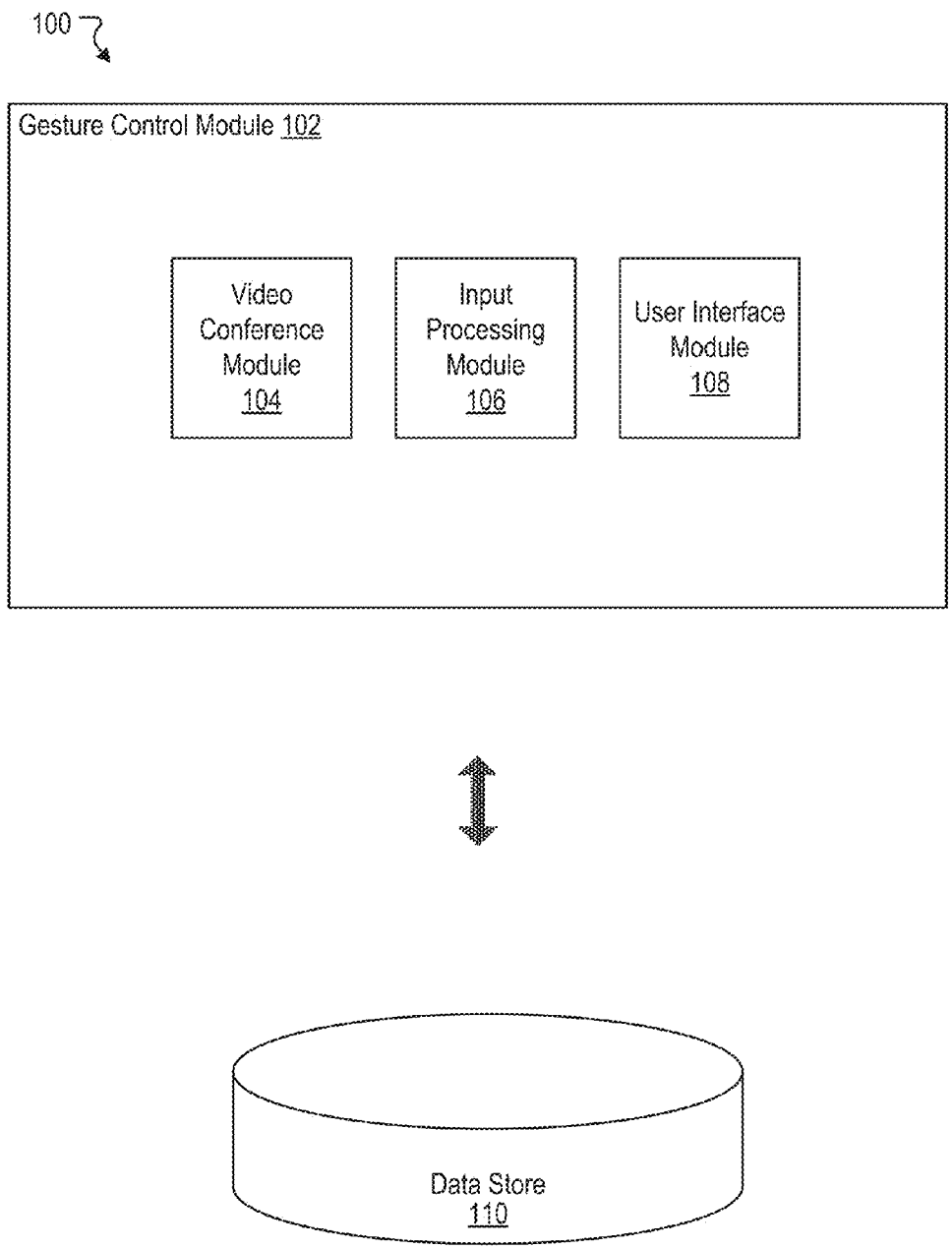
FIG. 1 illustrates a system including an example gesture control module configured to control equipment in video communications based on gesture, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Gesture-Based Control of Equipment in Video Communications

Interactions in a social network may involve various types of communication. Some types of communication supported by a social networking system allow a user to engage in focused exchanges. For example, the user may target a particular user or users through the use of a messaging system or an email system supported by the social networking system. As another example, the user can enter into audio communications or video communications supported by the social networking system with another user.

In many instances, video communications can be preferred by users because video communications can allow the users to most effectively convey information and simulate real life communications. For example, two or more participants in different locations can engage in video communications. Video communications can occur using a video conferencing system. A video conferencing system can include a variety of equipment, such as one or more cameras to capture video data of participants at a particular location.

Conventional approaches specifically arising in the realm of computer technology can provide a control panel to control a camera used in a video conferencing system. For example, the control panel can display buttons for moving the camera in different directions (e.g., up, down, left, right), zooming the camera in/out, etc. However, in many instances, the control panel does not display an output of the camera (e.g., a view as captured by the camera) as the camera is being controlled. Therefore, it can be difficult for a user to adjust the camera precisely using the control panel.

In some cases, conventional approaches specifically arising in the realm of computer technology can provide automated control of a camera used in a video conferencing system. For instance, the camera will automatically move to focus on a person who is speaking. However, there is often a delay between when the person starts speaking and when the camera moves. Moreover, the automated control of the camera often cannot reliably follow speaker movement.

An improved approach rooted in computer technology can overcome the foregoing and other disadvantages associated with conventional approaches specifically arising in the realm of computer technology. Based on computer technology, the disclosed technology can provide gesture-based control of equipment used in video communications, such as cameras. For example, the disclosed technology can provide a control panel for controlling a camera used in a video communication. The control panel can receive touch inputs and display an output of the camera. The control panel can also display a wide-angle view of a location at which a video communication takes place (e.g., a conference room) in order to provide a context of the location to a user. For example, the wide-angle view can be provided by the same camera or an additional camera at the location. To control the camera, a user can interact with the output of the camera and/or the wide-angle view of the location as displayed on the control panel using touch gestures. Touch gestures that are recognized by the control panel can be defined and mapped to camera movements or other functions relating to the camera, its position, or its operation. The functions can include, for example, move up/down/left/right, zoom in/out, or any other type of physical movement or any other type of operation that can be performed by a camera or applied to the camera. The control panel can receive a touch input from a user, interpret the touch input to determine a camera movement or function associated with the touch input, and send an instruction to the camera to execute the camera movement or function associated with the touch input. In this way, users can control the camera in an easy and intuitive manner by directly interacting with the output of the camera and/or the wide-angle view of the location.

FIG. 1 illustrates an example system 100 including an example gesture control module 102 configured to control equipment in video communications based on gesture, according to an embodiment of the present technology. A video communication can include a video event or session (e.g., video conference). For illustrative purposes, the techniques discussed in the present disclosure are described in connection with video conferences and video conferencing systems, and the techniques can apply to any type of video communication and any type of system used in a video communication.

A location where video conferences take place (e.g., a conference room) can be set up with equipment used in video conferences, such as one or more cameras, one or more screens, a control panel, etc. Examples of cameras used for video conferences can include a wide-angle camera, a pan-tilt-zoom ("PTZ") camera, or any other type of camera. For example, the video conference location can have a single PTZ camera. Or the video conference location can have a wide-angle camera that captures a wide-angle view of the location and a PTZ camera that zooms in on a specific area of the location and captures a more detailed view of the specific area. One or more screens can display video data for video conferences, such as video data of participants at other locations. For example, the one or more screens can be installed in front of a conference room so that participants at the video conference location can view participants at other locations. The one or more screens can be separate from a control panel. A control panel can be used to control equipment used in video conferences, such as cameras. The control panel can also provide various video conferencing features, such as calling from one location to another location, adding a location as a participant to a video conference, etc. In some embodiments, the gesture control module 102 can be implemented as a part of the control panel.

The gesture control module 102 can be in communication with a touch screen. The touch screen can be separate from one or more screens that can used to display video data for video conferences. For example, the one or more screens can display video data of participants at other locations and generally may not be capable of receiving touch input. The gesture control module 102 can receive touch inputs via the touch screen, process the touch inputs, and control a camera based on the touch inputs. The gesture control module 102 can display an output of the camera on the touch screen. The output of the camera displayed on the touch screen may be referred to as a "camera output view." The gesture control module 102 can also display a wide-angle view of a video conference location on the touch screen. As mentioned above, the wide-angle view can provide a context of the video conference location to a user. The wide-angle view can be provided by the same camera or an additional camera at the video conference location, as explained further below. For example, if the video conference location is a conference room, the wide-angle view can display the entire conference room or almost the entire conference room. According to certain aspects, the wide-angle view can be referred to as a "context view." The wide-angle view can facilitate user control of a camera by showing an area that the camera is focusing on in the context of the video conference location. The wide-angle view can be captured by a wide-angle camera or by a PTZ camera (e.g., when the PTZ camera is zoomed out all the way). The gesture control module 102 can maintain the wide-angle view as the user controls the camera. For example, the gesture control module 102 can display both the wide-angle view and the output of the camera. Or the gesture control module 102 can display only the output of the camera as the user controls the camera, and the gesture control module 102 can periodically return to the wide-angle view in such cases.

A user can perform touch gestures in a camera output view or a wide-angle view or, or both, in order to control a camera at the video conference location. For example, the user can perform a touch gesture for zooming in in the wide-angle view, and a camera at the video conference location can be zoomed in. The gesture control module 102 can update data displayed on the touch screen to reflect that the camera has been zoomed in. In the this example, after the camera is zoomed in, the user can perform another touch gesture in the wide-angle view or in the camera output view. For example, the user can perform a touch gesture in the camera output view to further zoom in the camera. Or the user can perform a touch gesture in the camera output view to zoom out the camera. Similarly, the user can perform a touch gesture in the wide-angle view to zoom in or zoom out the camera. After the gesture control module 102 processes a touch gesture, the gesture control module 102 can display updated video data on the touch screen in response to the touch gesture.

In this manner, the gesture control module 102 can provide an intuitive way of controlling a camera used in video communications using touch gestures. The gesture control module 102 can incorporate an output of a camera and/or a wide-angle view into the control panel, and a user can interact directly with the camera output view and/or the wide-angle view. The examples described herein in connection with one or more cameras are for illustrative purposes, and the techniques described in this disclosure may also be applicable to any type of equipment used in video communications, such as video conferences.

The gesture control module 102 can include a video conference module 104, an input processing module 106, and a user interface module 108. In some instances, the example system 100 can include at least one data store 110. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the gesture control module 102 can be implemented in any suitable combinations.

The video conference module 104 can provide video conference control features. Video conference control features may refer to features for controlling various aspects of video conferences. Examples of video conference control features can include one or more of: start a video conference, end a video conference, add a participant/location, mute a microphone, etc. Buttons or icons for video conference control features can be displayed on a touch screen associated with the gesture control module 102, for example, along with a wide-angle view of a video conference location, a camera output view, etc.

The input processing module 106 can process touch inputs by users. For example, the input processing module 106 can detect a touch input by a user on a touch screen associated with the gesture control module 102, interpret the touch input, and control a camera based on the touch input. The input processing module 106 is described in more detail herein.

The user interface module 108 can generate a user interface associated with the gesture control module 102. For example, the user interface can be provided on a touch screen associated with the gesture control module 102. The user interface can display a camera output view associated with a camera and/or a wide-angle view of a video conference location. In some embodiments, the user interface module 108 can generate a user interface that displays both the camera output view and the wide-angle view. In a video conference setup using two cameras (e.g., a wide-angle camera and a PTZ camera), the first camera can be dedicated to capturing a wide-angle view of the video conference location, and the second camera can pan, tilt, or zoom to capture a more detailed view of a specific area of the video conference location. In the two-camera setup, the camera output view can display video data of the second camera, and the wide-angle view can display video data of the first camera. In a video conference setup using one camera (e.g., a PTZ camera), the single camera can capture a static wide-angle view of the video conference location prior to capturing a more detailed view of a specific area of the video conference location. In the one-camera setup, the camera output view can display video data of the single camera, and the wide-angle view can display the static wide-angle view taken by the same camera. The user interface module 108 can maintain the static wide-angle view for a period of time based on an assumption that participants at a location generally do not move around during a video conference. A new static wide-angle view can be captured, for example, periodically, to obtain an updated wide-angle view of the video conference location. A static wide-angle view can be captured in many different ways. In some embodiments, a user-requested pan or zoom operation can be combined with a zoom out and snapshot operation. For example, if a user chooses to zoom in, the camera can quickly zoom out, take a snapshot of a wide-angle view, and then zoom into an area the user selected. In certain embodiments, the camera can gradually zoom out to take a snapshot of a wide-angle view and then zoom back in, which can provide a smooth transition for participants at other locations. In some embodiments, switching to a digital zoom can be used. The camera can be optically zoomed out to capture a wide-angle view, but displayed video data (e.g., in the camera output view) can be digitally zoomed back in so that participants at other locations can see the same field of view even though the camera has zoomed out. The camera can take a snapshot of a wide-angle view and optically zoom back in. As mentioned above, wide-angle views can be captured periodically. All examples herein are provided for illustrative purposes, and there can be many variations and other possibilities.

As explained above, the user interface module 108 can generate a user interface that displays both the camera output view and the wide-angle view. In some cases, the user interface can provide an indication of the camera output view in the wide-angle view. For example, the user interface can indicate a perimeter or boundary around an area in the wide-angle view that corresponds to the camera output view. The user interface module 108 can calibrate the wide-angle view and the camera output view in order to determine which portion of the wide-angle view corresponds to the camera output view. For example, the wide-angle view can be a fully zoomed out view, and the camera output view can be a 12× zoom on a document to be shared among participants in a video conference. Through calibration, the user interface module 108 can determine that a particular area of the wide-angle view corresponds to the 12× zoom of the document. The zoom can be an optical zoom. In other embodiments, the zoom can be a digital zoom. Calibration can also help ensure that touch gestures are processed according to correct proportions and scale.

The user interface module 108 can also generate a user interface that displays only the camera output view or only the wide-angle view. In certain embodiments, the user interface module 108 can generate a user interface that displays only a camera output view. For example, a video conference setup can include one camera, and the user interface can display an output of the single camera as a user controls the camera using touch gestures. In other embodiments, the user interface module 108 can generate a user interface that displays only a wide-angle view. For example, the user interface can provide an indication of a camera output view in the wide-angle view without separately displaying the camera output view.

The user interface module 108 can also display buttons for video conference control features in the user interface. Video conference control features may be features provided by the video conference module 104. In this manner, various controls for video conferences and output from one or more cameras can be displayed in an integrated manner, for example, within the same user interface.

The user interface module 108 can generate an updated user interface in response to touch inputs, camera movements or functions, etc. The user interface module 108 can update the user interface when a touch is input is received. For example, the user interface can show a perimeter in the wide-angle view to indicate a particular area to be zoomed in. The user interface module 108 can also update the user interface as a camera is being controlled. For instance, the user interface can be updated to display zoomed in video data in the camera output view as a camera is being zoomed in.

In some embodiments, the gesture control module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the gesture control module 102 can be, in part or in whole, implemented as software running on one or more computing devices or systems, such as on a server system or a client computing device. In some instances, the gesture control module 102 can be, in part or in whole, implemented within or configured to operate in conjunction or be integrated with a social networking system (or service), such as a social networking system 630 of FIG. 6. Likewise, in some instances, the gesture control module 102 can be, in part or in whole, implemented within or configured to operate in conjunction or be integrated with a client computing device, such as the user device 610 of FIG. 6. For example, the gesture control module 102 can be implemented as or within a dedicated application (e.g., app), a program, or an applet running on a user computing device or client computing system. It should be understood that many variations are possible.

The data store 110 can be configured to store and maintain various types of data, such as the data relating to support of and operation of the gesture control module 102. The data maintained by the data store 110 can include, for example, information relating to touch gestures, equipment used in video communications, including one or more cameras, instructions associated with the one or more cameras, video conference control features, video conferencing systems, etc. The data store 110 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the gesture control module 102 can be configured to communicate and/or operate with the data store 110. In some embodiments, the data store 110 can be a data store within a client computing device. In some embodiments, the data store 110 can be a data store of a server system in communication with the client computing device.

Figure 2:
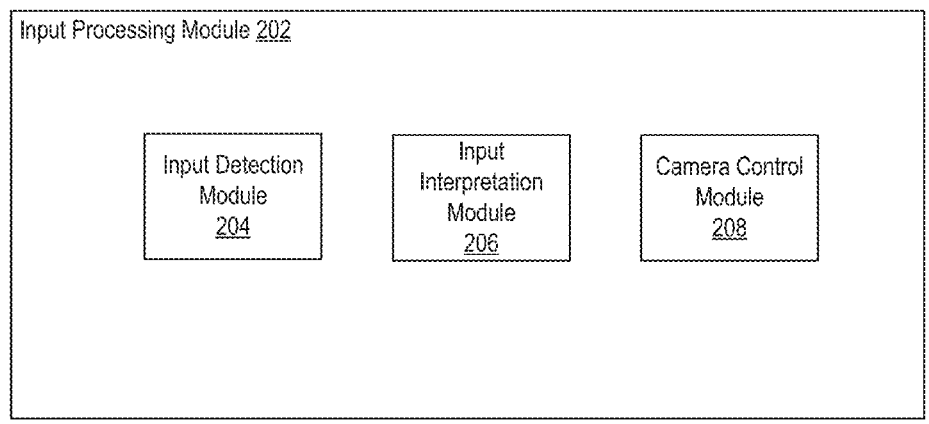
FIG. 2 illustrates an example input processing module configured to process a touch input for controlling equipment in video communications, according to an embodiment of the present technology.

FIG. 2 illustrates an example input processing module 202 configured to process a touch input for controlling equipment in video communications, according to an embodiment of the present technology. In some embodiments, the input processing module 106 of FIG. 1 can be implemented with the input processing module 202. As shown in the example of FIG. 2, the input processing module 202 can include an input detection module 204, an input interpretation module 206, and a camera control module 208.

The input detection module 204 can detect touch inputs by users on a touch screen, for example, associated with the gesture control module 102. The input detection module 204 can determine the shape and dimensions of a touch input. The input detection module 204 can determine one or more coordinates or positions associated with the touch input. The touch input can be a touch gesture. Examples of touch gestures can include, but are not limited to, fingertip strokes, fingertip swipes, stylus strokes, stylus swipes, and/or other touch (or near-touch) movements. The input detection module 204 can correspond to and/or operate with the touch screen in order to detect, identify, or otherwise process touch gestures.

The input interpretation module 206 can interpret a touch input to determine one or more camera movements or functions associated with the touch input. The input interpretation module 206 can define touch gestures that are associated with particular camera movements or functions. Examples of camera movements or functions can include zoom in, zoom out, pan, tilt, move up, move down, move left, move right, wide-angle view, or any other type of movement or function provided by a camera. For example, a pinch out gesture can be associated with the zoom in movement or function, and a pinch in gesture can be associated with the zoom out movement or function. A swipe in a particular direction can be associated with a movement in that direction, a tap on a particular location can be associated with a movement to that location, etc. In some cases, a touch gesture can involve two more camera movements or functions. For example, if a touch gesture is for zooming in a camera, but the camera is focused on a different area from an area to be zoomed in, camera movements or functions can include panning to the area to be zoomed in and zooming in on that area. All examples herein are provided for illustrative purposes, and there can be many variations and other possibilities.

The input interpretation module 206 can determine whether a received touch input corresponds to a defined touch gesture. For example, the input interpretation module 206 can compare the shape, orientation, trajectory, direction, or other characteristic of the touch input to defined touch gestures. If the shape of the touch input matches or otherwise corresponds to a defined touch gesture, the input interpretation module 206 can recognize the touch input as a valid touch gesture. The input interpretation module 206 can refer to dimensions of the touch input to determine a magnitude for the camera movement or function associated with the touch gesture. For instance, if the touch input is identified as a touch gesture for zooming in, dimensions of the touch input can be used to determine how much to zoom in (e.g., what level of zoom).

As mentioned above, a wide-angle view and a camera output view can be calibrated in order to determine which portion of the wide-angle view corresponds to the camera output view. Based on the calibration, the input interpretation module 206 can determine the proportion between the wide-angle view and the camera output view. For example, the input interpretation module 206 can determine the proportion between an extent of a touch input in the wide-angle view and a corresponding extent of camera movement or function. The input interpretation module 206 can interpret the dimensions or scale of the touch input based on the proportion in order to determine a magnitude of the corresponding camera movement or function. For example, a user can perform a touch gesture for panning a camera (e.g., swiping a finger from one location to another location on a touch screen), and the input interpretation module 206 can determine the distance and/or path for panning the camera based on the dimensions of the touch gesture and the proportion between the wide-angle view and the camera output view. In some embodiments, the camera output view is not displayed on the touch screen, but the wide-angle view and the output of the camera can be calibrated in order to determine the proportion between the wide-angle view and the output of the camera. For example, the input interpretation module 206 can determine an extent of a touch input in the wide-angle view and a corresponding extent of camera movement or function, and can interpret the dimensions or scale of the touch input based on the proportion.

In certain embodiments, the input interpretation module 206 can provide intelligent zoom features. For example, if a user performs a touch gesture near or on a face or an object that is shown on a touch screen, a camera can be zoomed in on the face or the object. The input interpretation module 206 can define one or more touch gestures associated with intelligent zoom features. For example, a tap or a double tap on or near a face or object can be associated with a camera movement or function for zooming in on the tapped face or object. When a user performs a touch gesture on a touch screen associated with intelligent zoom features, the input interpretation module 206 can identify any face or object shown on the touch screen in or near an area associated with the touch gesture, determine a region or perimeter around the identified face or object, and zoom in on the region. The input interpretation module 206 can utilize various algorithms to identify faces, objects, etc. The algorithms can detect a face or an object and/or define a region around the face or the object. In some cases, machine learning can be used to identify faces, objects, etc. For instance, machine learning models can be trained to identify predefined objects. In some cases, contrast can be used to identify objects. For instance, the input interpretation module 206 can compare the color of pixels in or near the tapped area to determine if the color changes among pixels. In one example, the input interpretation module 206 can start with the tapped area and scan outward until the input interpretation module 206 finds pixels of different color. Many variations are possible.

The camera control module 208 can communicate with a camera in order to control the camera. For example, the camera control module 208 can send instructions to a camera to execute particular camera movements or functions. Instructions sent by the camera control module 208 can include one or more commands or routines provided by an application programming interface (API) associated with the camera. In some cases, the camera control module 208 may need to send multiple commands in order to execute a particular camera movement or functions. For example, a camera movement or function associated with a touch gesture can be to move the camera to a location that is diagonal from a current location (e.g., upper right). If the API associated with the camera only provides commands for moving the camera up, down, left, or right, the camera control module 208 can send a command to the camera to move in a horizontal direction and send a command to the camera to move in a vertical direction (e.g., right and up). Many variations are possible. The input interpretation module 206 or the camera control module 208 can determine an instruction that needs to be sent in order to execute a camera movement or function associated with a touch gesture.

Figure 3B:
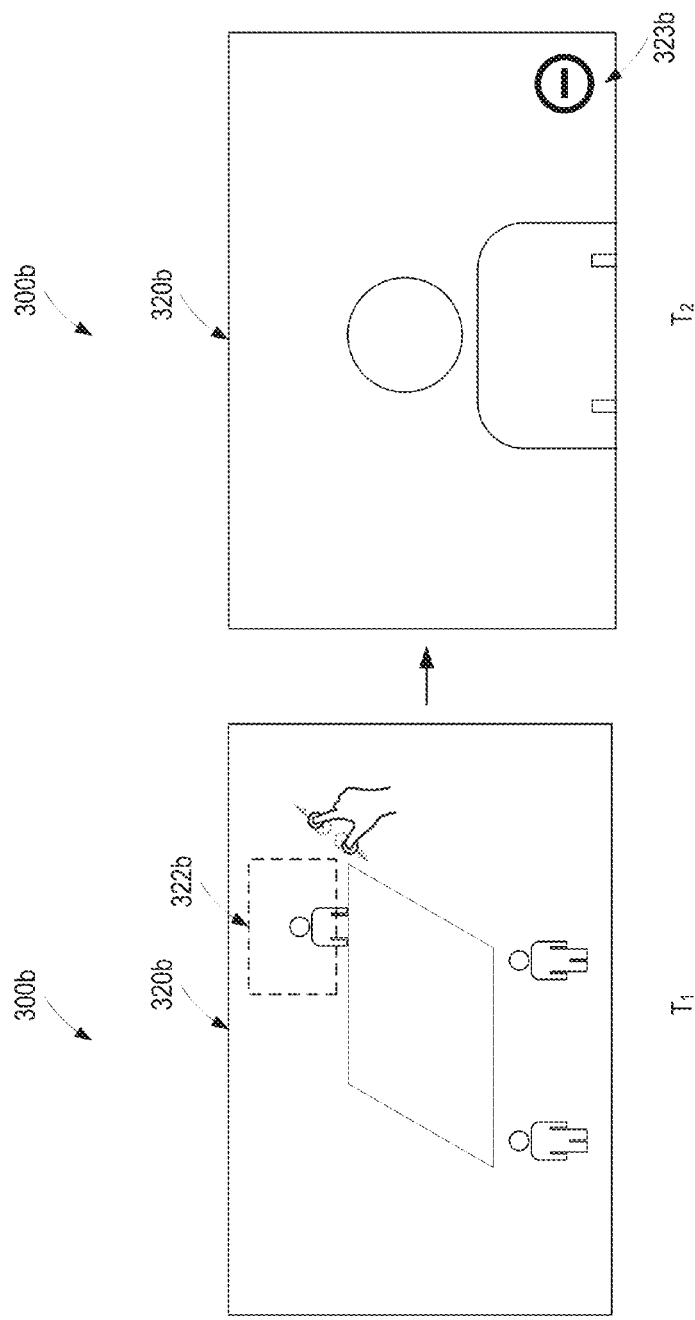

FIGS. 3A-3C illustrate example user interfaces 300a-300c for gesture-based control of equipment in video communications, according to an embodiment of the present technology. As explained above, the user interfaces 300a-300c can be provided on a touch screen. For example, the touch screen can be associated with a gesture control module 102 discussed in connection with FIG. 1.

In FIG. 3A, an example user interface 300a includes a wide-angle view 310a and a camera output view 320a. The user interface 300a also includes video conference control features 330a. The video conference control features 330a can include an icon for starting a video conference 331a, an icon for adding a participant/location 332a, an icon for muting a microphone 333a, an icon for ending a video conference 334a, etc. The video conference control features 330a can include any other icons for controlling video conferences.

In the example of FIG. 3A, the wide-angle view 310a can present a view of an entire video conference location, and the camera output view 320a can present a view of a camera at the video conference location. For instance, the camera output view 320a displays video data captured by the camera, which is zoomed in on a particular participant at the video conference location. A perimeter 311a in the wide-angle view 310a can indicate an area in the wide-angle view that is being displayed in the camera output view 320a.

In some embodiments, one or more cameras at a remote video conference location can be controlled using touch gestures. In such cases, the wide-angle view 310a in the user interface 300a can show a wide-angle view captured by a camera at the remote video conference location. The camera output view 320a in the user interface 300a can show the camera output view of a camera at the remote video conference location. In some instances not illustrated, the camera output view 320a may not be shown in the user interface 300a and instead can be displayed on one or more screens displaying video data for the video conference.

In FIG. 3B, an example user interface 300b includes only a camera output view 320b. Although not shown, the user interface 300b can also include video conference control features 330a in FIG. 3A. FIG. 3B shows the camera output view 320b of a camera at two different times, $T_1$ and $T_2$. At time $T_1$, a user performs a pinch out gesture to zoom in the camera on a particular participant. In certain embodiments not shown, the user can perform a double tap gesture on a participant to zoom in on the face of a particular participant. The area to be zoomed in can be determined based on the extent of the pinch out gesture. The area to be zoomed in 322b can be indicated in dashed lines shown in the user interface. FIG. 3B shows a hand making a pinch out gesture to represent the user making the pinch out gesture. To facilitate illustration, the hand is shown beside the area to be zoomed in 322b, but, in reality, the pinch out gesture is made in the area to be zoomed in 322b. The camera output view 320b can be updated to show the output of the camera as it is being zoomed in between time $T_1$ and time $T_2$. At time $T_2$, the camera output view 320b shows the output of the camera after the camera has been zoomed in according to the pinch out gesture.

In the example of FIG. 3B, the camera output view 320b does not provide a context view of the video conference location, so the user may not know how far to zoom out in order to fully zoom out to the wide-angle view. Accordingly, when zoomed in, the camera output view 320b can include an icon 323b for zooming out fully or all the way, e.g., to the wide-angle view. The user may perform other touch gestures at or after time $T_2$ to control the camera, such as a pinch in gesture for zooming out.

In FIG. 3C, an example user interface 300c includes only a wide-angle view 310c. Although not shown, the user interface 300c can also include video conference control features 330a in FIG. 3A. FIG. 3C shows the wide-angle view 310c of a camera at two different times, $T_1$ and $T_2$. At time $T_1$, a user performs a pinch out gesture to zoom in the camera on a particular participant. In certain embodiments, the user can perform a double tap gesture on a participant to zoom in on the face of a particular participant. The area to be zoomed in can be determined based on the extent of the pinch out gesture. The area to be zoomed in can be indicated in dashed lines 312c shown in the user interface. Similar to FIG. 3B, to facilitate illustration, FIG. 3C shows a hand beside the area to be zoomed in 312c, but the pinch out gesture is actually made in an area that corresponds to the area to be zoomed in 312c. Since the user interface 300c only includes the wide-angle view 310c, the wide-angle view 310c can be updated to indicate a perimeter 314c around a region that is zoomed in on. At time $T_2$, the wide-angle view 310c shows the perimeter 314c after the camera has been zoomed in according to the pinch out gesture. The perimeter 314c represents the view of the camera shown to participants of the video conference. According to certain aspects, the perimeter 314c can be similar to the perimeter 311a in FIG. 3A.

Figure 4:
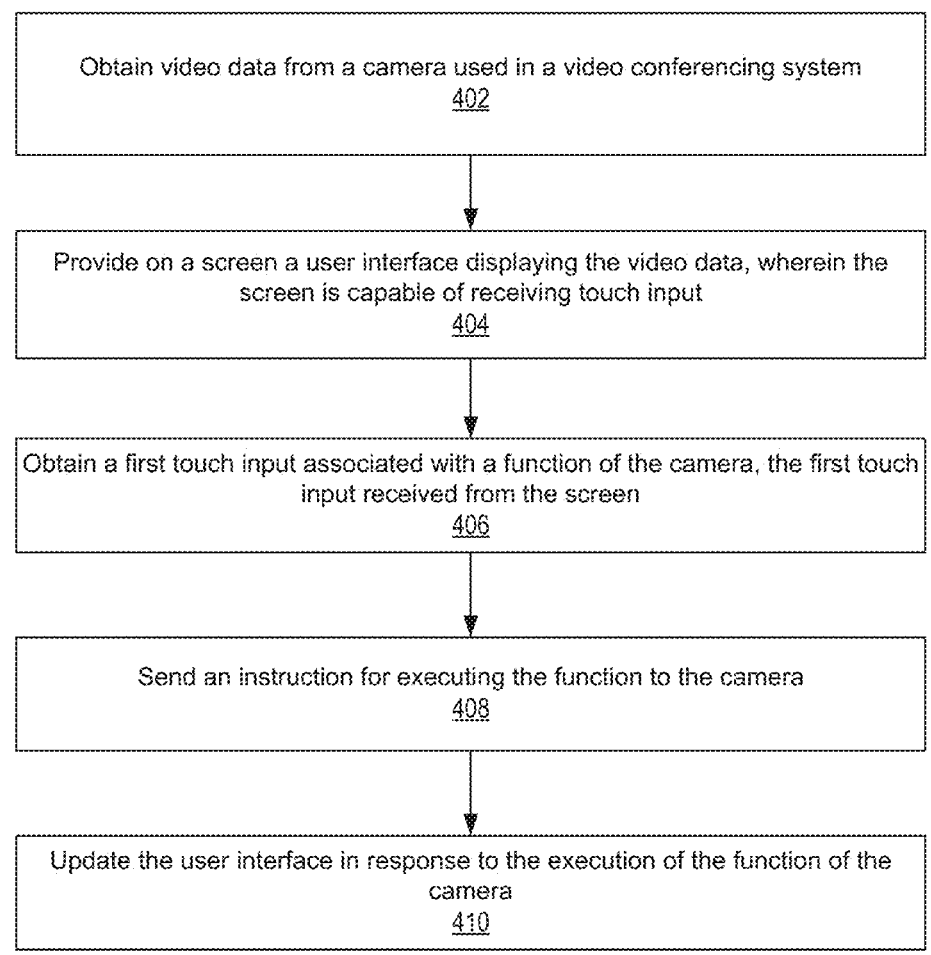
FIG. 4 illustrates a first method for gesture-based control of equipment in video communications, according to an embodiment of the present technology.

FIG. 4 illustrates an example first method 400 for gesture-based control of equipment in video communications, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can obtain video data from a camera used in a video conferencing system. At block 404, the example method 400 can provide on a screen a user interface displaying the video data, wherein the screen is capable of receiving touch input. At block 406, the example method 400 can obtain a first touch input associated with a function of the camera, the first touch input received from the screen. At block 408, the example method 400 can send an instruction for executing the function to the camera. At block 410, the example method 400 can update the user interface in response to the execution of the function of the camera. Other suitable techniques that incorporate various features and embodiments of the present technology are possible.

Figure 5:
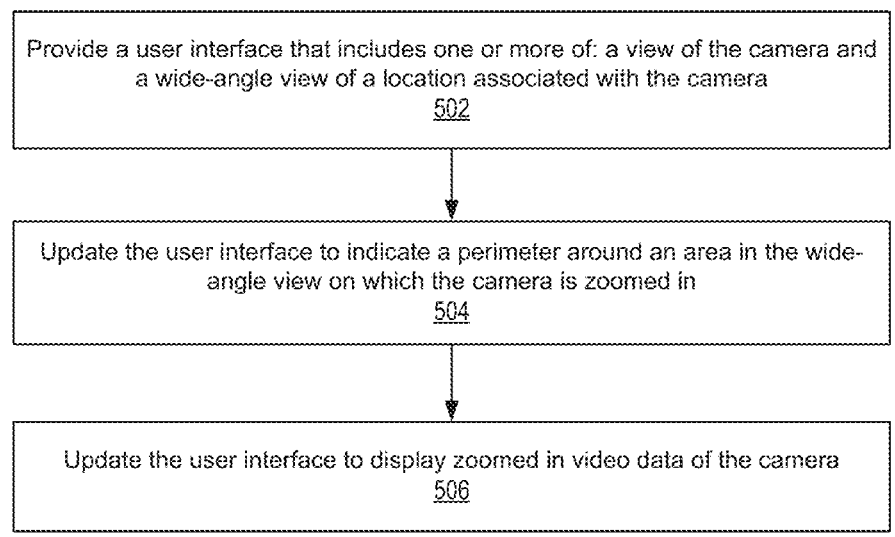
FIG. 5 illustrates a second method for gesture-based control of equipment in video communications, according to an embodiment of the present technology.

FIG. 5 illustrates an example second method 500 for gesture-based control of equipment in video communications, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can provide a user interface that includes one or more of: a view of the camera and a wide-angle view of a location associated with the camera. For example, the user interface includes both a view of the camera and a wide-angle view of a location associated with the camera. The user interface can be similar to the user interface explained in connection with FIG. 4. A touch input can be similar to the touch input explained in connection with FIG. 4. A function of the camera can be similar to the function of the camera explained in connection with FIG. 4. The touch input can be a touch gesture for zooming in the camera, and the function of the camera can be a zoom in of the camera. At block 504, the example method 500 can update the user interface to indicate a perimeter around an area in the wide-angle view on which the camera is zoomed in. At block 506, the example method 500 can update the user interface to display zoomed in video data of the camera. Other suitable techniques that incorporate various features and embodiments of the present technology are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
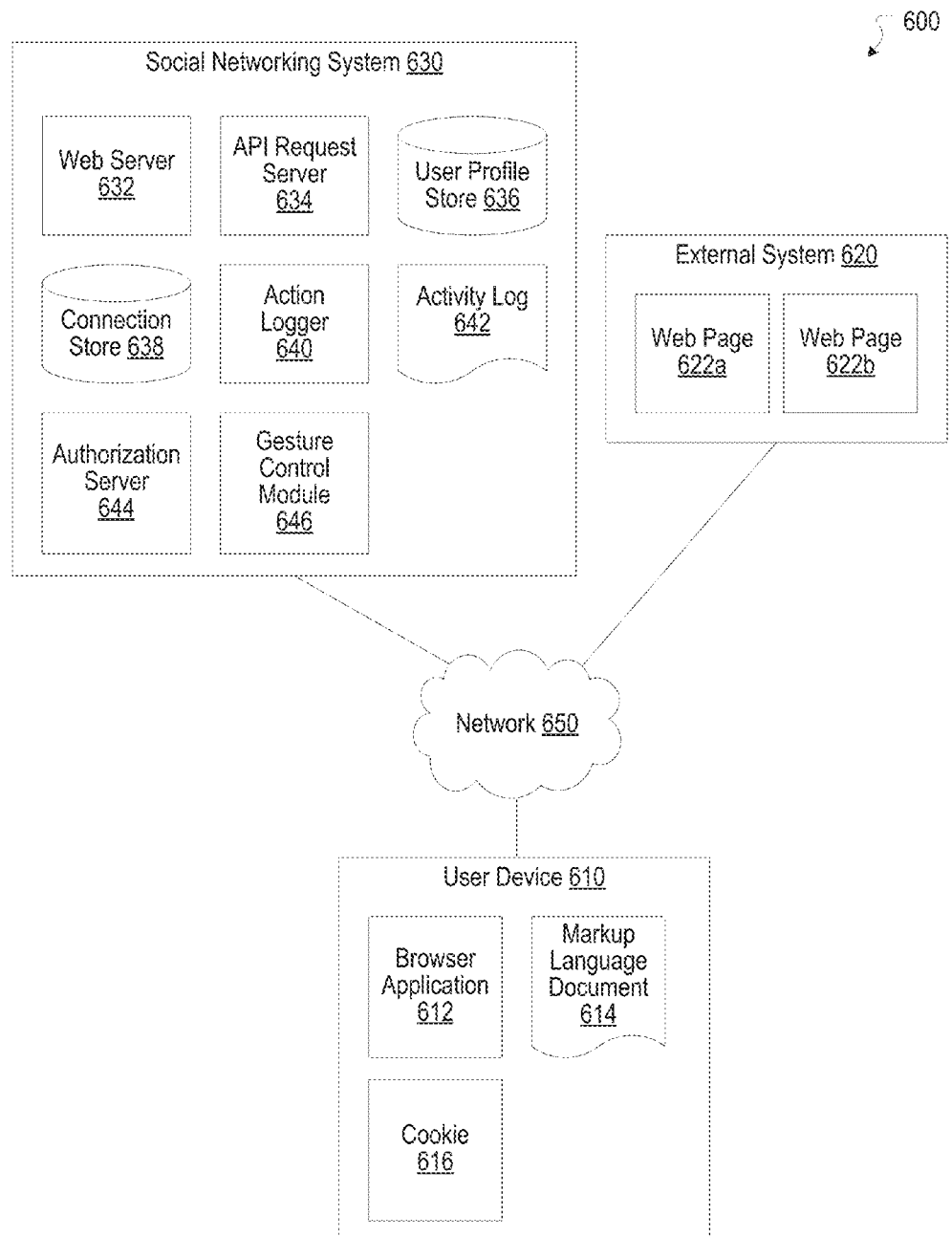
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution.

In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a gesture control module 646. The gesture control module 646 can be implemented with the gesture control module 102, as discussed in more detail herein. In some embodiments, one or more functionalities of the gesture control module 646 can be implemented in the user device 610.

Hardware Implementation

Figure 7:
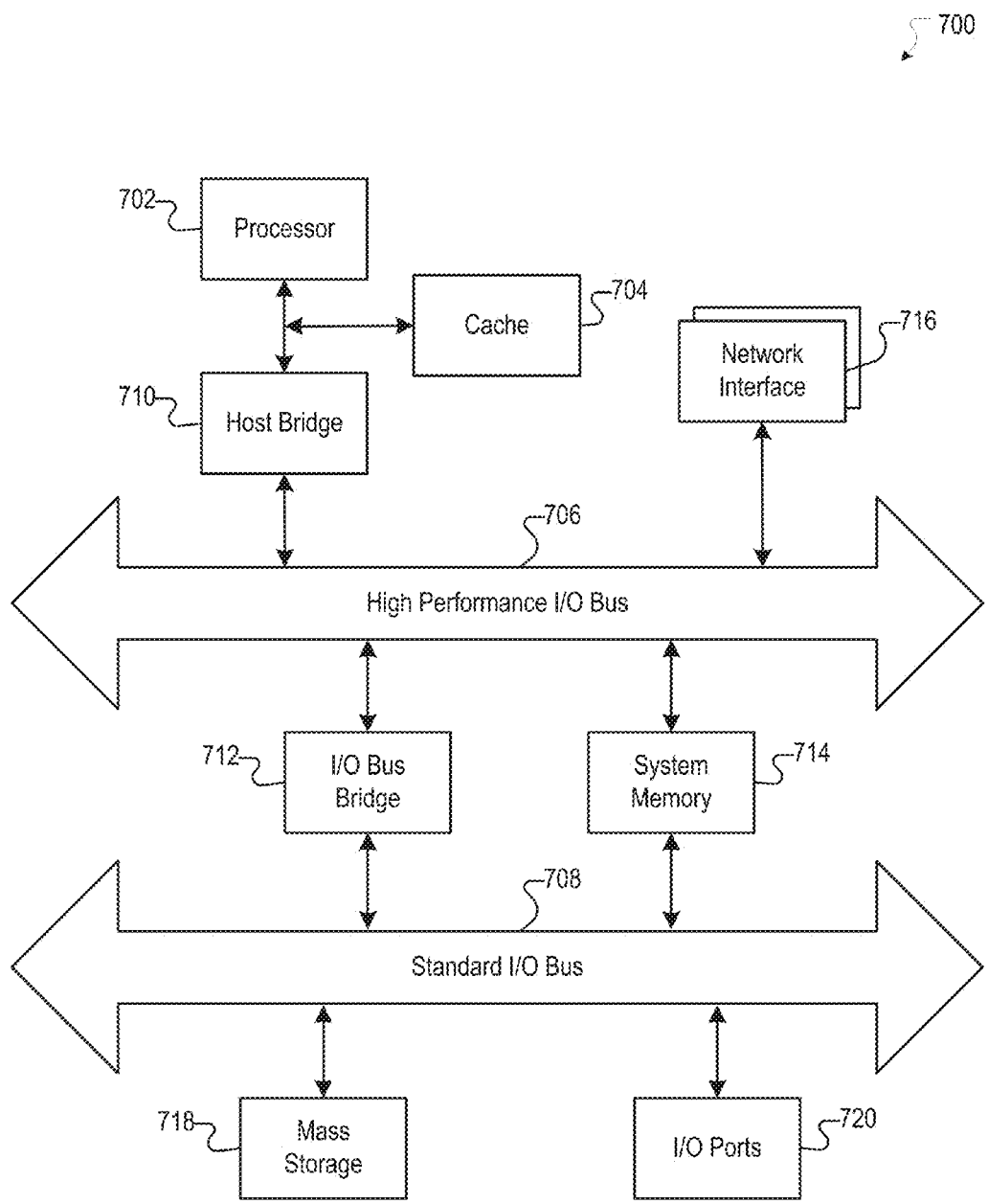
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    obtaining, by a computing system, video data from a camera used in a video conferencing system;
    providing on a screen, by the computing system, a user interface displaying the video data, wherein the screen is capable of receiving touch input, and wherein the user interface includes a view of the camera and a wide-angle view of a location associated with the camera, the wide-angle view captured by the camera periodically;
    obtaining, by the computing system, a first touch input associated with a function of the camera, the first touch input received from the screen;
    sending, by the computing system, an instruction for executing the function to the camera; and
    updating, by the computing system, the user interface in response to the execution of the function of the camera.

2. The computer-implemented method of claim 1, wherein the first touch input is a touch gesture associated with the function of the camera.

3. The computer-implemented method of claim 1, wherein the camera is a pan-tilt-zoom (PTZ) camera.

4. The computer-implemented method of claim 1, wherein the wide-angle view of the location is obtained by the camera based on one or more of: zooming out the camera in connection with a pan or zoom operation, gradually zooming out and zooming back in, or zooming out the camera and applying a digital zoom for the view of the camera.

5. The computer-implemented method of claim 1, wherein the first touch input is a touch gesture for zooming in the camera, the function of the camera is a zoom in of the camera, and the updating the user interface includes indicating a perimeter around an area in the wide-angle view on which the camera is zoomed in.

6. The computer-implemented method of claim 1, wherein the first touch input is a touch gesture for zooming in the camera, the function of the camera is a zoom in of the camera, and the updating the user interface includes displaying zoomed in video data of the camera.

7. The computer-implemented method of claim 1, wherein the first touch input is a touch gesture for zooming in the camera, the function of the camera is a zoom in of the camera, and the method further comprises: automatically recognizing at least one of a face or an object in one or more positions associated with the first touch input; and zooming in the camera on the at least one of a face or an object.

8. The computer-implemented method of claim 1, wherein the user interface includes a plurality of icons associated with control features of the video conferencing system.

9. A system comprising:
at least one hardware processor; and
a memory storing instructions that, when executed by the at least one processor, cause the system to:
 obtain video data from a camera used in a video conferencing system;
 provide on a screen a user interface displaying the video data, wherein the screen is capable of receiving touch input, and wherein the user interface includes a view of the camera and a wide-angle view of a location associated with the camera, the wide-angle view captured by the camera periodically;
 obtain a first touch input associated with a function of the camera, the first touch input received from the screen;
 send an instruction for executing the function to the camera; and
 update the user interface in response to the execution of the function the camera.

10. The system of claim 9, wherein the first touch input is a touch gesture associated with the function of the camera.

11. The system of claim 9, wherein the first touch input is a touch gesture for zooming in the camera, the function of the camera is a zoom in of the camera, and the update of the user interface includes indicating a perimeter around an area in the wide-angle view on which the camera is zoomed in.

12. The system of claim 9, wherein the first touch input is a touch gesture for zooming in the camera, the function of the camera is a zoom in of the camera, and the update of the user interface includes displaying zoomed in video data of the camera.

13. A non-transitory computer readable medium including instructions that, when executed by at least one hardware processor of a computing system, cause the computing system to:
 obtain video data from a camera used in a video conferencing system;
 provide on a screen a user interface displaying the video data, wherein the screen is capable of receiving touch input, and wherein the user interface includes a view of the camera and a wide-angle view of a location associated with the camera, the wide-angle view captured by the camera periodically;
 obtain a first touch input associated with a function of the camera, the first touch input received from the screen;
 send an instruction for executing the function to the camera; and
 update the user interface in response to the execution of the function of the camera.

14. The non-transitory computer readable medium of claim 13, wherein the first touch input is a touch gesture associated with the function of the camera.

15. The non-transitory computer readable medium of claim 13, wherein the first touch input is a touch gesture for zooming in the camera, the function of the camera is a zoom in of the camera, and the update of the user interface includes indicating a perimeter around an area in the wide-angle view on which the camera is zoomed in.

16. The non-transitory computer readable medium of claim 13, wherein the first touch input is a touch gesture for zooming in the camera, the function of the camera is a zoom in of the camera, and the update of the user interface includes displaying zoomed in video data of the camera.

* * * * *